US012388851B2

(12) United States Patent
Gupta et al.

(10) Patent No.: US 12,388,851 B2
(45) Date of Patent: Aug. 12, 2025

(54) SYSTEM AND METHOD FOR DETECTING MALICIOUS ATTEMPTS TO DISCOVER VULNERABILITIES IN A WEB APPLICATION

(71) Applicant: Citrix Systems, Inc., Fort Lauderdale, FL (US)

(72) Inventors: Ankur Gupta, Bengaluru (IN); Venkata Surya Narayana raju Datla, West Godavari (IN); Anjana P Pai, Bengaluru (IN); Premkumar Sj, Tamil Nadu (IN); Manikam Muthiah, Bengaluru (IN)

(*) Notice: Subject to any disclaimer, the term of this patent is extended or adjusted under 35 U.S.C. 154(b) by 768 days.

(21) Appl. No.: 17/497,294

(22) Filed: Oct. 8, 2021

(65) Prior Publication Data
US 2023/0114298 A1    Apr. 13, 2023

(51) Int. Cl.
*H04L 29/06*    (2006.01)
*H04L 9/40*    (2022.01)
*H04L 29/08*    (2006.01)
*H04L 67/02*    (2022.01)

(52) U.S. Cl.
CPC ...... *H04L 63/1425* (2013.01); *H04L 63/1416* (2013.01); *H04L 63/1433* (2013.01); *H04L 63/145* (2013.01); *H04L 67/02* (2013.01)

(58) Field of Classification Search
CPC ............ H04L 63/1425; H04L 63/1416; H04L 63/1433; H04L 63/145; H04L 67/02
See application file for complete search history.

(56) References Cited

U.S. PATENT DOCUMENTS

| | | | |
|---|---|---|---|
| 10,534,791 B1 * | 1/2020 | Block | G06F 16/2228 |
| 10,735,285 B2 * | 8/2020 | Verma | H04L 43/065 |
| 2017/0163676 A1 * | 6/2017 | Bank | H04L 63/1425 |
| 2017/0302505 A1 * | 10/2017 | Zafer | H04L 41/0631 |
| 2019/0319976 A1 * | 10/2019 | Kopp | H04L 63/166 |
| 2020/0183899 A1 * | 6/2020 | Xu | G06F 16/2365 |
| 2021/0174253 A1 * | 6/2021 | Moore | G06N 7/01 |
| 2021/0334673 A1 * | 10/2021 | Butvinik | G06N 20/00 |
| 2022/0366341 A1 * | 11/2022 | Smotra | G06F 16/215 |

* cited by examiner

*Primary Examiner* — Kambiz Zand
*Assistant Examiner* — Afaq Ali

(57) ABSTRACT

Described embodiments provide systems and methods for identifying malicious attempts to detect vulnerabilities in an application. At least one processor may determine a mean and a standard variation of character counts of each of a plurality of characters from a plurality of sets of data. The at least one processor may determine a distance metric for each of the characters in each of the sets of data. For a corresponding set of data, the at least one processor may determine a number of outliers to determine whether the corresponding set of data is anomalous.

18 Claims, 10 Drawing Sheets

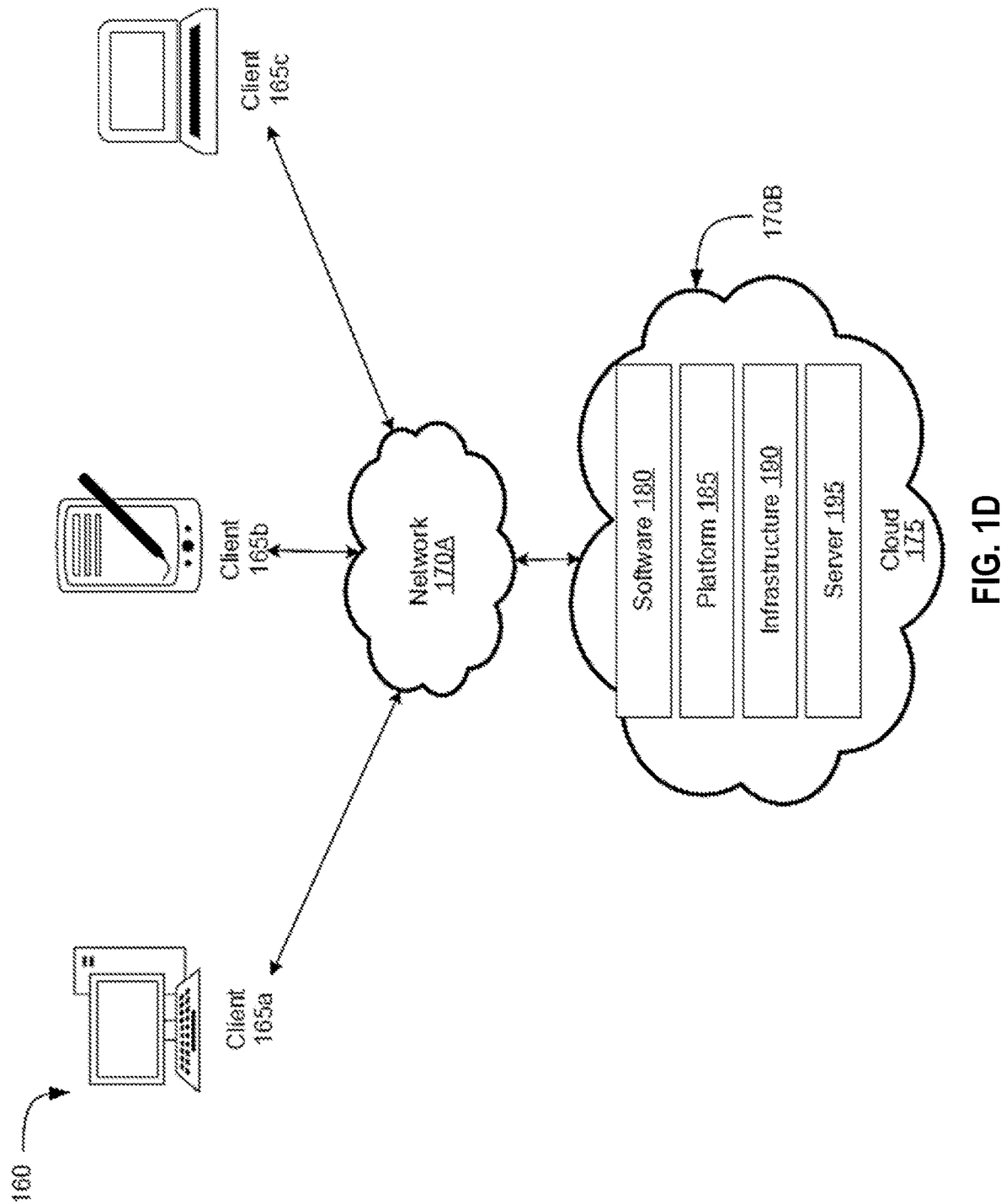

SYSTEM AND METHOD FOR DETECTING MALICIOUS ATTEMPTS TO DISCOVER VULNERABILITIES IN A WEB APPLICATION

FIELD OF THE DISCLOSURE

The present application generally relates to protecting applications or resources from malicious entities, including but not limited to systems and methods for identifying attempts from malicious entities to detect vulnerabilities in one or more applications.

BACKGROUND

Certain applications are vulnerable to malicious attempts to access or use said applications. Such malicious attempts can be executed or launched by a malicious entity or attacker, with the intention of detecting any vulnerabilities in the applications. If the malicious entity identifies a vulnerability in an application, the malicious entity can gain increased accessibility to sensitive information of an organization. Furthermore, the attacker can use the obtained sensitive information to access other secured applications associated with the organization, thereby increasing the extent of the security breach.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for identifying malicious attempts (e.g., from an attacker and/or malicious actor) to detect vulnerabilities in one or more applications (e.g., an application resource, such as a web application, SaaS application and/or remote-hosted network application), thereby preventing malicious actors or bots from accessing sensitive, secured and/or critical information, and/or performing unauthorized actions in a computing system and/or network. For instance, the systems and methods described herein can identify a malicious attempt via telemetry associated with a request, such as a hypertext transfer protocol (HTTP) message/request (e.g., a HTTP request to access and/or use a web application). Indeed, the systems and methods can protect any resource, application and/or service that uses character-based messages and/or requests (e.g., messages that include objects used to represent text, numbers, and/or symbols) from said malicious attempts to detect vulnerabilities. In one example, embodiments of the systems and methods can use lexical and/or structural information of a HTTP request (or other requests) to determine whether said request is associated with (or includes) an attempt to discover a vulnerability in an application.

In one aspect, the present disclosure is directed to a method for identifying attempts to detect vulnerabilities in an application. The method can include determining, by at least one processor, a mean and a standard variation of character counts of each of a plurality of characters from a plurality of sets of data. The at least one processor may determine a distance metric for each of the characters in each of the sets of data. For a corresponding set of data, the at least one processor may determine a number of outliers to determine whether the corresponding set of data is anomalous.

In some embodiments, determining the number of outliers may comprise determining, by the at least one processor for the corresponding set of data, the number of outliers according to a number of the character counts that each exceeds a corresponding threshold. The at least one processor may determine the corresponding threshold according to a distance metric determined for a corresponding character. In certain embodiments, the at least one processor may determine that the corresponding set of data is anomalous when the number of outliers exceeds a first threshold, and the distance metrics in aggregate for the corresponding set of data exceeds a second threshold. The at least one processor may determine that the plurality of sets of data is anomalous when a number of the sets of data in the group that is anomalous exceeds a third threshold. The third threshold can be determined according to a Binomial distribution. In some embodiments, the at least one processor may initiate a remedial or preventive action responsive to determining that the plurality of sets of data is anomalous. In certain embodiments, each of the sets of data may comprise a component of a message or a file. Each of the sets of data may comprise: a header component, a uniform resource locator (URL) component or a parameter component, of a hypertext transfer protocol (HTTP) message.

In one aspect, the present disclosure is directed to a device comprising at least one processor. The at least one processor may be configured to determine a mean and a standard variation of character counts of each of a plurality of characters from a plurality of sets of data. The at least one processor may be configured to determine a distance metric for each of the characters in each of the sets of data. For a corresponding set of data, the at least one processor may be configured to determine a number of outliers to determine whether the corresponding set of data is anomalous.

In some embodiments, the at least one processor may be configured to determine the number of outliers by determining, for the corresponding set of data, the number of outliers according to a number of the character counts that each exceeds a corresponding threshold. The at least one processor may be configured to determine the corresponding threshold according to a distance metric determined for a corresponding character. In certain embodiments, the at least one processor may be configured to determine that the corresponding set of data is anomalous when the number of outliers exceeds a first threshold, and the distance metrics in aggregate for the corresponding set of data exceeds a second threshold. The at least one processor can be configured to determine that the plurality of sets of data is anomalous when a number of the sets of data in the group that is anomalous exceeds a third threshold. The third threshold may be determined according to a Binomial distribution. In certain embodiments, the at least one processor may be configured to initiate a remedial or preventive action responsive to determining that the plurality of sets of data is anomalous. Each of the sets of data may comprise a component of a message or a file. In certain embodiments, each of the sets of data may comprise: a header component, a uniform, resource locator (URL) component or a parameter component, of a hypertext transfer protocol (HTTP) message.

In one aspect, the present disclosure is directed to a non-transitory computer readable medium storing program instructions. The program instructions stored in a non-transitory computer readable medium may cause at least one processor to determine a mean and a standard variation of character counts of each of a plurality of characters from a plurality of sets of data. The program instructions may cause the at least one processor to determine a distance metric for each of the characters in each of the sets of data. The program instructions may cause the at least one processor to determine, for a corresponding set of data, a number of outliers to determine whether the corresponding set of data is anomalous. In certain embodiments, the program instructions can further cause the at least one processor to determine, for the corresponding set of data, the number of outliers according to a number of the character counts that each exceeds a corresponding threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1D is a block diagram depicting a computing environment comprising client device in communication with cloud service providers, in accordance with an illustrative embodiment;

DETAILED DESCRIPTION

Figure 1A:
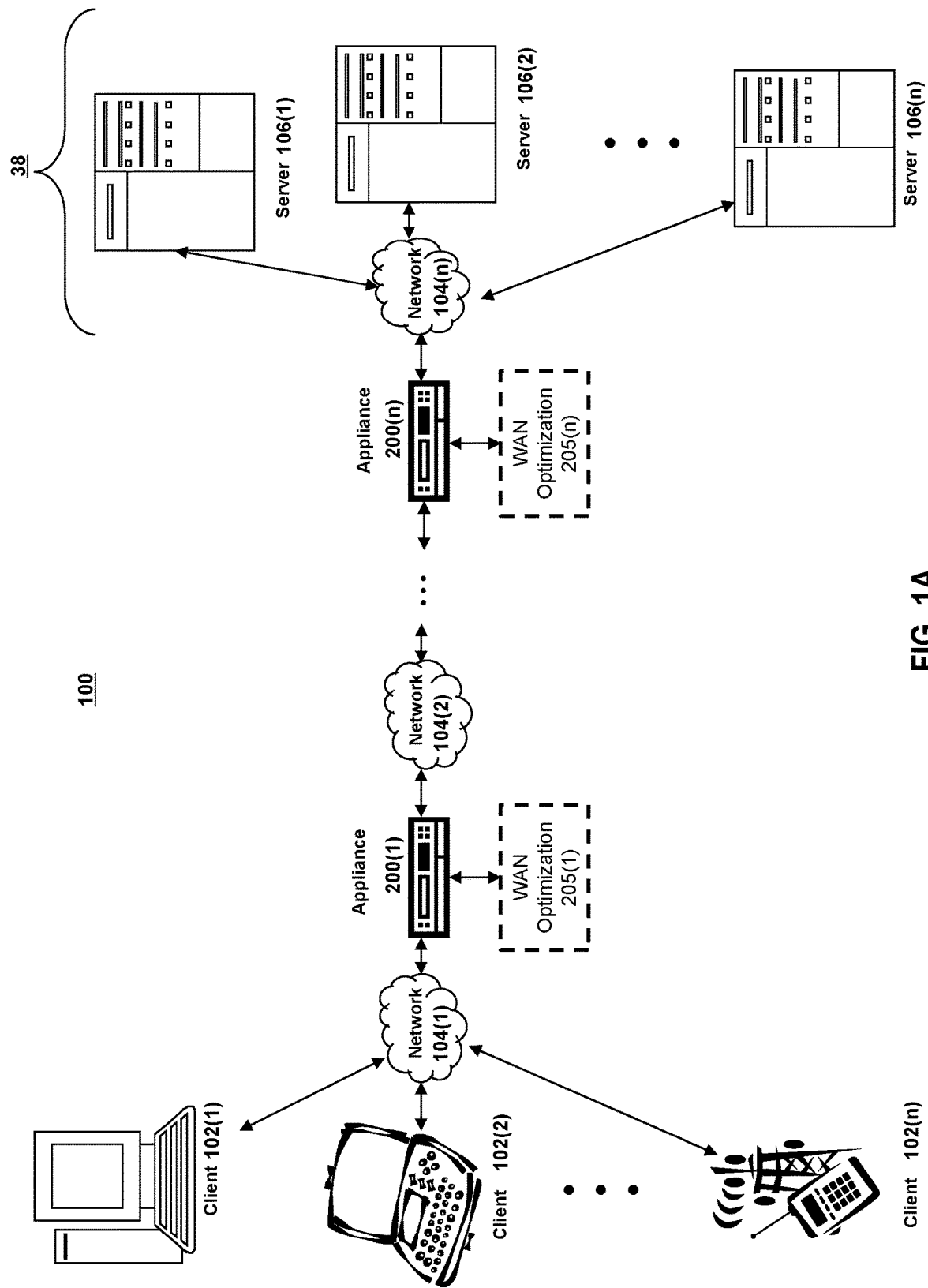
FIG. 1A is a block diagram of a network computing system, in accordance with an illustrative embodiment.

Certain applications, resources, and/or services may be vulnerable to unauthorized or malicious attempts to access, use and/or exploit the applications/resources/services. Such unauthorized/malicious attempts can be executed, performed, and/or launched by a malicious actor or attacker, with the intention of detecting and/or identifying any vulnerabilities and/or weaknesses (e.g., security weaknesses) in the applications. If a malicious actor identifies a vulnerability in an application, the malicious actor can potentially access sensitive, secured and/or critical information of an organization, user, and/or corporate entity, for instance (e.g., by exploiting or taking advantage of the identified vulnerability). Furthermore, the attacker can use the obtained sensitive and/or critical information to access and/or use other secured applications or resources associated with the organization, thereby increasing the impact or extent of the security breach. In one example, a malicious actor can attempt to identify a vulnerability in a computing system and/or network by obtaining information of an application, such as a version and/or architecture of a plurality of components of the application. Responsive to obtaining said information, the malicious actor may determine that at least one of the plurality of components includes a known weakness and/or vulnerability (e.g., a security risk) for which public exploits are available. As such, the malicious actor may use the known weaknesses to access, use or otherwise maliciously engage with the application, and thereby perform unauthorized/malicious actions (e.g., cross privilege boundaries) within the computer system or network.

In certain scenarios, a malicious attempt to detect a vulnerability can lead to the discovery and/or uncovering of an unknown (e.g., unknown to attackers, administrators, developers, and/or users of the application) weakness in the application (e.g., a net new bug/weakness). Knowledge of said unknown weakness can be used to generate and/or create novel attacks that capitalize on the recently discovered (e.g., previously unknown) weakness, and/or other weaknesses in associated systems, such as a server (e.g., a backend server supporting hypertext transfer protocol (HTTP) and/or hypertext transfer protocol secure (HTTPS)), a database, a client (e.g., a smartphone, a laptop, a tablet device, a desktop computer of a user, and/or a client supporting HTTP/HTTPS), peer networks and/or other systems. As such, a discovery of an unknown weakness (e.g., in an application and/or system) by a malicious actor can lead to a zero-day attack. If a malicious actor uses or exploits one or more unknown (e.g., unknown to developers, administrators, and/or users of the application) vulnerabilities to launch an attack on said application/system, the attack can correspond to a zero-day attack. Zero-day attacks are notoriously difficult to detect and/or identify, since, by definition, the attacks are novel (e.g., given the lack of knowledge by a user, administrator, and/or developer of the vulnerability of the application). Therefore, traditional approaches (e.g., signature-based approaches and/or other approaches) are unable to detect and/or prevent zero-day attacks. However, during the process of discovering (e.g., by a malicious actor) such unknown vulnerabilities/weaknesses in an application/service/resource, the malicious actor can perform a plurality of attempts to discover unknown vulnerabilities, before at least one vulnerability is discovered. As such, monitoring, tracking or otherwise observing traffic (e.g., client traffic) from and to an application, resource, and/or service can enable the identification of the attempts to discover unknown vulnerabilities, thereby decreasing the risk of a zero-day attack.

The systems and methods discussed herein may identify malicious attempts to detect vulnerabilities in one or more applications (e.g., an application resource, such as a web application, SaaS application and/or remote-hosted network application), thereby preventing unauthorized malicious actors or bots from accessing sensitive, secured and/or critical information. For instance, the systems and methods described herein can identify a malicious attempt via telemetry associated with a request, such as a HTTP message/request. Indeed, the systems and methods can protect any resource, application and/or service that uses character-based messages and/or requests from said malicious attempts to detect vulnerabilities. In one example, embodiments of the systems and methods can use lexical and/or structural information of a HTTP request (or other requests) to determine whether said request is associated with an attempt to discover a vulnerability in an application/resource/service.

In certain embodiments, the systems and methods can include a novelty-detection approach that can be applied to a plurality of Natural Language Processing (NLP) tasks. In some embodiments, the systems and methods can include a novel approach for learning contextual and structural features from a given a request, such as a HTTP request. In some embodiments, the systems and methods may include a novel unsupervised classification approach for detecting attempts to discover vulnerabilities in an application, service, and/or resource (e.g., differentiate the attempts from normal traffic to and from an application). In certain embodiments, the systems and methods can include a binomial threshold approach for improving a specificity of the systems and methods. In some embodiments, the systems and methods may include a novel online learning approach that can evolve over time based on an incoming traffic pattern (e.g., a pattern of traffic being received by an application/resource/service).

For purposes of reading the description of the various embodiments below, the following descriptions of the sections of the specification and their respective contents may be helpful:
Section A describes a network environment and computing environment which may be useful for practicing embodiments described herein;
Section B describes embodiments of systems and methods for delivering a computing environment to a remote user;
Section C describes embodiments of systems and methods for identifying malicious attempts to detect vulnerabilities in an application.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
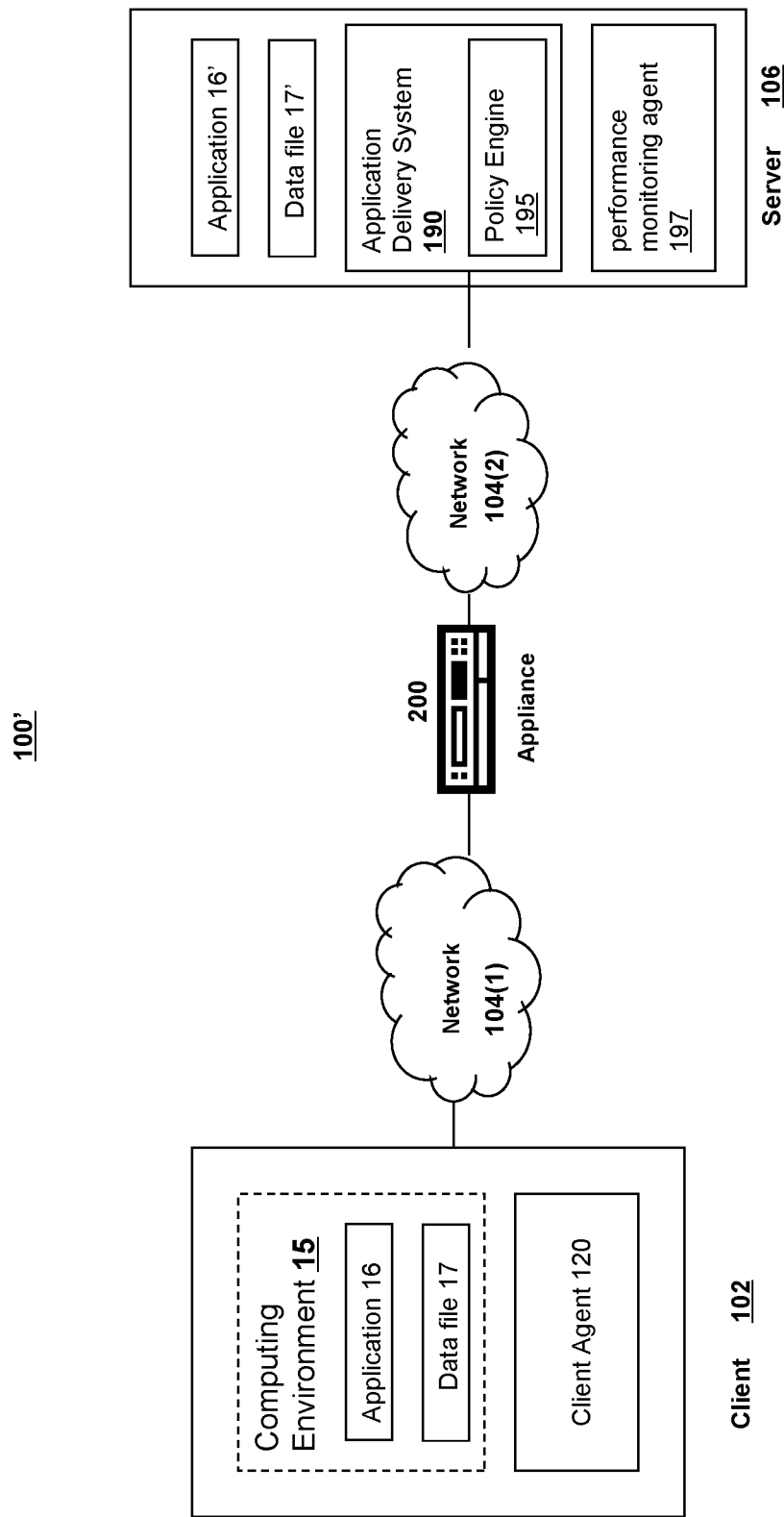
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1)

transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
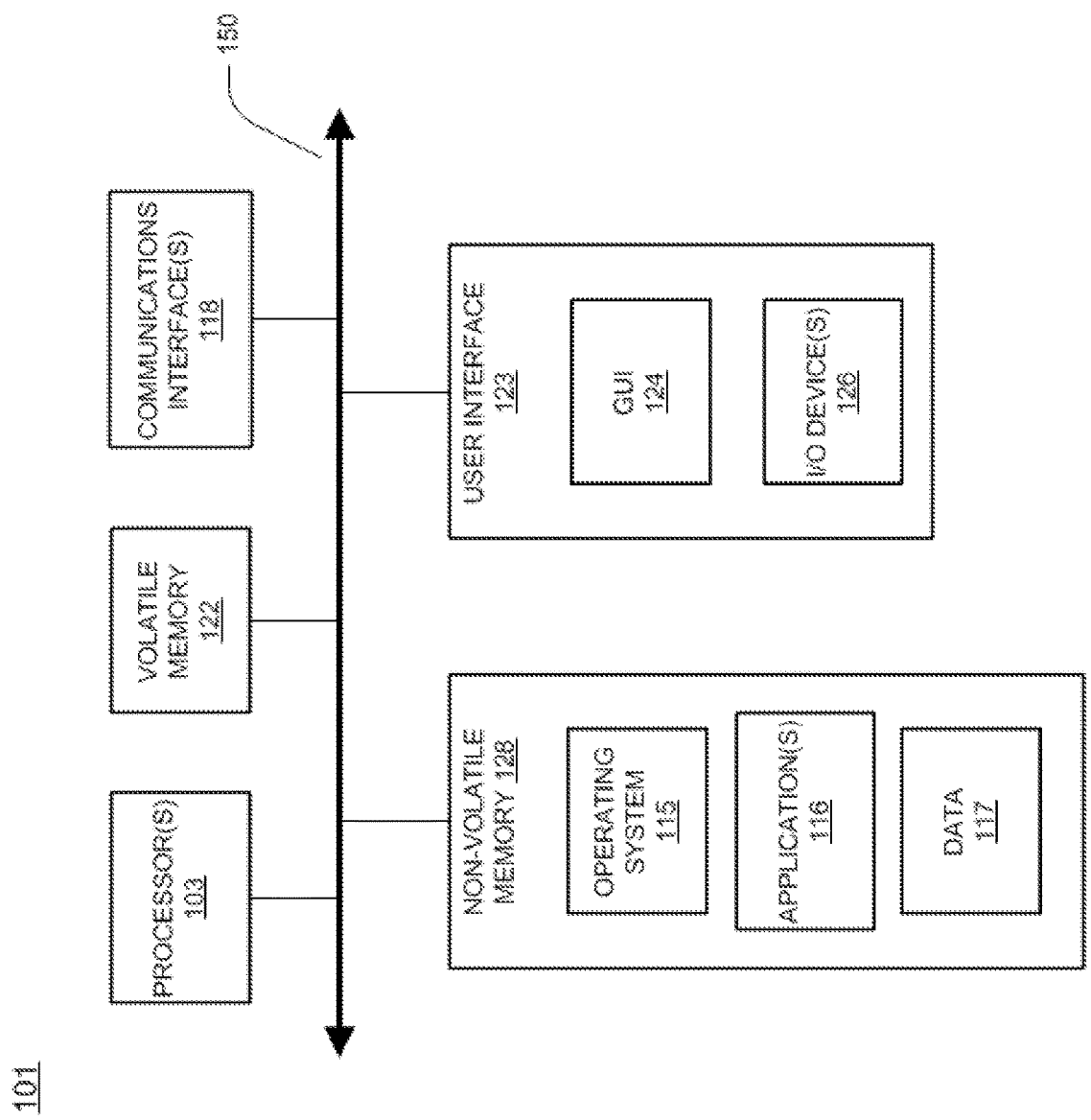
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
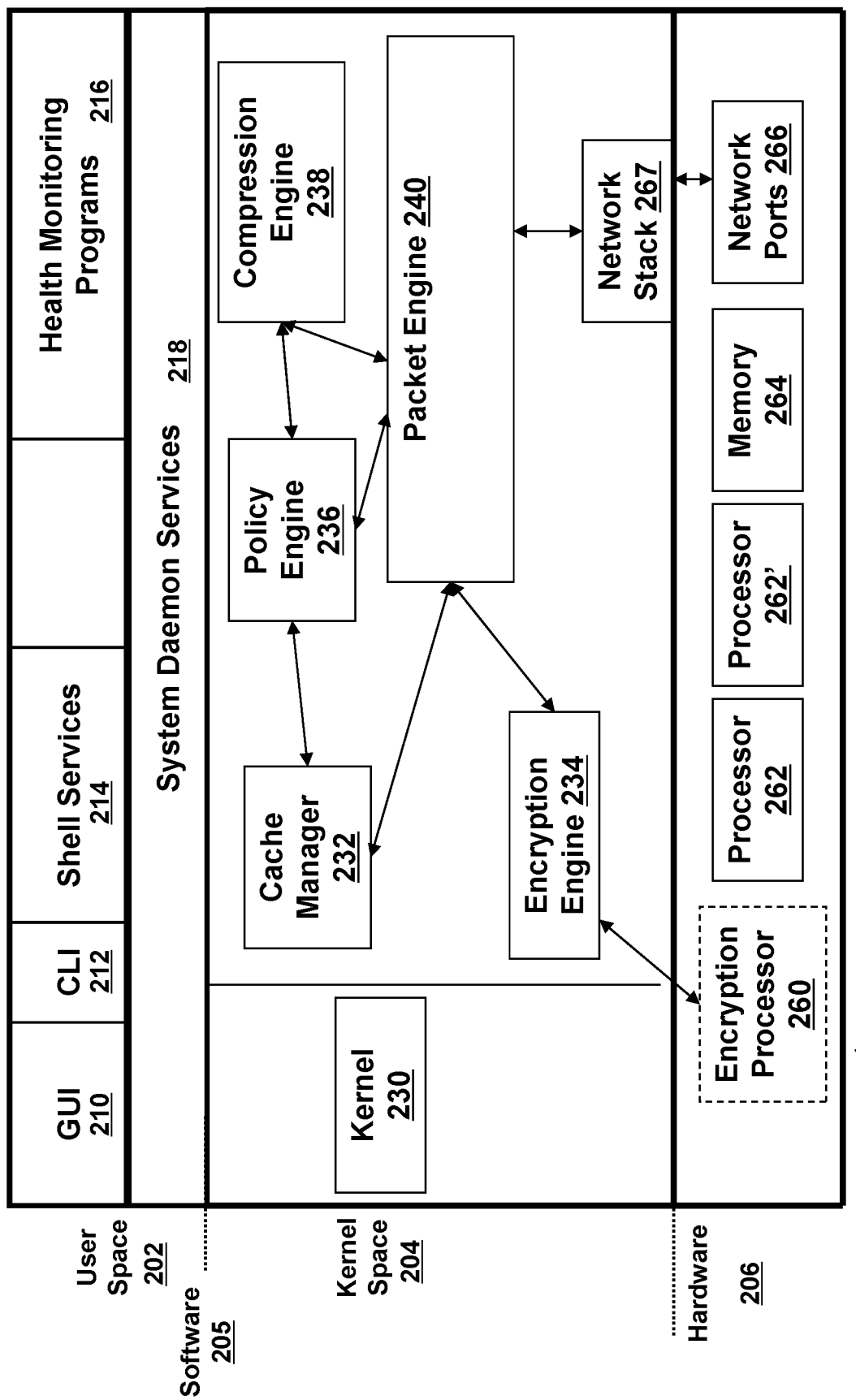
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Identifying Malicious Attempts to Detect Vulnerabilities in an Application The systems and methods presented herein include a novel approach for detecting and/or identifying malicious attempts/efforts (e.g., via messages and/or requests) to discover, uncover, or otherwise identify vulnerabilities/weaknesses in an application, resource and/or service (or other components of a computer system). Once a vulnerability is discovered by a malicious actor, for example, the malicious actor can exploit or otherwise use the discovered vulnerability to perform unauthorized actions within an associated computer system and/or network. The systems and methods discussed herein can be described according to one or more levels of mechanisms/processing.

Level 1: A Novelty Detection Approach

Figure 3:
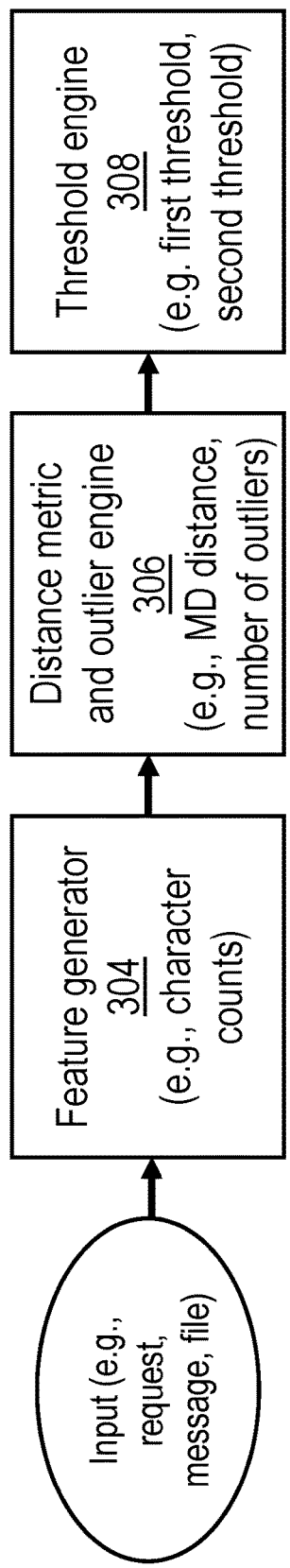
FIG. 3 is a block diagram of a system for detecting a novel or unknown sensory pattern in a text- or character-based request (e.g., message or document), in accordance with an illustrative embodiment.

A novelty detection approach can include one or more mechanisms to identify a sensory pattern (e.g., a pattern of a text- or character-based request/message) as being unknown. If the sensory pattern is sufficiently salient and/or associated with an unknown distribution, the sensory pattern (or request/message that includes the sensory pattern) can be classified as (or determined to be) an anomaly (e.g., a possible attempt to detect a vulnerability). An unsupervised novelty detection approach may collect, use, and/or learn a pattern or distribution from a known (e.g., normal and/or non-anomalous) sensory pattern to determine a corresponding known distribution. If a distribution associated with an incoming (e.g., processed by the novelty detection approach) sensory pattern is sufficiently distinct from the known distribution (or associated with an unknown concept), the incoming sensory pattern can be classified as (or determined to be) a novelty. Referring now to FIG. 3, depicted is a block diagram of one example embodiment of a system 300 for detecting a novel or unknown sensory pattern in a text- or character-based request/message (e.g., a request or message that includes text or characters, or a packet/document/file/stream/collection of text or characters). The system 300 may include a feature generator 304, a distance metric and outlier engine 306, a threshold engine 308, and/or other components. The system 300 of FIG. 3 can be applied to a plurality of natural language processing (NLP) applications. In one example, the system 300 can receive, obtain, analyze, and/or process any text (e.g., text of a HTTP request or other requests), file, message, and/or request comprising alpha-numeric and/or special characters, in one or more languages for instance. A character can be used to represent text, numbers, or symbols. In certain embodiments, the text or file can have a plurality of lengths.

In certain embodiments, the feature generator 304 may be configured and/or designed to determine character counts (e.g., a frequency of occurrence of a character) of each of a plurality of characters from a plurality of sets of data. In one example, the plurality of sets of data can include or correspond to one or more components of a message/request/text/file, and/or one or more files/messages/texts/requests. Responsive to determining the character counts, the feature generator 304 can determine, compute, and/or calculate a mean, a standard variation, and/or other statistical properties of the character counts of each of the plurality of characters. In certain embodiments, the feature generator 304 can use a vocabulary (e.g., a set of words or characters in a corpus) of a corpus (e.g., a plurality of sets of data) to determine the character counts. For example, the feature generator 304 can determine the character counts according to a vocabulary of the plurality of sets of data.

In one example, the feature generator 304 can determine and/or count the number of occurrences of each of a plurality of characters (e.g., character counts) in the vocabulary of a corresponding set of data from the plurality of sets of data (e.g., a given file or text of the corpus). The number of times a character occurs in a corresponding set of data (e.g., HTTP message) can include or correspond to a character count. In one example, the character count of a character c in a file, text or message D can be referred to as (or indicated by) cf(c,D). In certain embodiments, the feature generator 304 can perform a normalization operation on the character counts. The normalization operation can address variations in length across a plurality of texts, files, messages, and/or requests of a corpus (or across one or more components of a particular file or text). In one example, the feature generator 304 can normalize the character counts according to (or based on) a length of the file or text (or components of the file/text) that includes the particular character. In certain embodiments, the feature generator 304 may normalize the character counts of a file D with a length N according to Ncf(c,D)=cf(c,D)/N. Responsive to determining (and/or normalizing) the character counts, the feature generator 304 can determine a mean, a standard variation, and/or other statistical properties of the character counts of each of the plurality of characters.

The feature generator 304, the distance metric and outlier engine 306, and/or the threshold engine 308 may each comprise hardware, or a combination of hardware and software (e.g., one or more programs or services that are executable on hardware of the feature generator 304, the distance metric and outlier engine 306, and/or the threshold engine 308). The feature generator 304 may interface and/or interact with one or more of the distance metric and outlier engine 306, the threshold engine 308, and/or other elements, e.g., to determine whether a corresponding set of data from the plurality of sets of data is anomalous.

In certain embodiments, the distance metric and outlier engine 306 may be configured and/or designed to determine a distance metric for each of the characters in each of the plurality of sets of data. For a particular file (e.g., a corresponding set of data), for example, the distance metric may indicate and/or specify a distance or separation between a distribution (e.g., a pattern) associated with the particular file and a known or seen distribution (e.g., a distribution of a plurality of sets of data, such as a corpus). The distance metric can be determined according to a Euclidean distance metric, a Manhattan distance metric, a Minkowaski distance metric, a Hamming distance metric, and/or other metrics. One or more of the above-discussed metrics (e.g., Euclidean, Manhattan and/or others) may use and/or compute a pair-wise distance, which can be computationally inefficient and/or difficult to scale to high-dimensional spaces (e.g., the curse of dimensionality).

In certain embodiments, the distance metric and outlier engine 306 may determine a computationally-efficient distance metric referred to as a MD distance (e.g., together with a number of identified outlier characters). A MD distance (e.g., the distance metrics of characters in aggregate) can measure, specify, and/or indicate an absolute distance between a character count for a given character and a mean value of the character count for the given character, summed over a plurality of character counts (e.g., character counts of each of a plurality of characters from a plurality of sets of data). Determining the MD distance can avoid a calculation of pair-wise distances, while capturing the intuition of the pair-wise distances. The MD distance can be normalized according to (or based on) a mean value of a character count (e.g., L1/L2 norm), a standard deviation of character count (e.g., L1/L2 norm), a min-max normalization, a maximum distance, and/or other metrics/parameters. In one example, the distance metric and outlier engine 306 may determine the MD distance according to $\text{dist}(x,\mu,\sigma)=\Sigma_{i=1}^{n-1}(|x-\mu_i|/\sigma_i)$. In certain embodiments, x can indicate and/or specify a character count of a sample $x \in [0,1]$. In certain embodiments, dim(x)=n can specify and/or indicate a number of characters in a vocabulary. In some embodiments, $\mu_i$ can specify a mean value of a character count for a character $c_i$. In certain embodiments, $\sigma_i$ may indicate a standard deviation value of a character count of a character $c_i$.

In certain embodiments, the MD distance (although computationally efficient) may be unable to consider and/or use characters that are not part of (or otherwise unknown to) the vocabulary (e.g., a set of words or characters of the plurality of sets of data). If a particular request, file, and/or message includes a new character (e.g., said character is excluded from the vocabulary), the distance metric and outlier engine 306 may be unable to determine or access a mean and/or standard variation (or other statistical properties) of the new character. As such, the distance metric and outlier engine 306 may use the character count of the new character (instead of a statistical property) to determine the distance metric (e.g., the MD distance). In certain embodiments, the distance metric and outlier engine 306 can use the distance metric of an individual character (e.g., $|x-\mu_i|/\sigma_i$) to compute/determine a number of outliers for a corresponding set of data (e.g., for a particular set of files/text/messages/requests, and/or a particular set of components of a file/text/message/request). A particular character may contribute to the number of outliers if the character count of the character exceeds a corresponding threshold. The corresponding threshold can be determined according to the distance metric (e.g., the individual MD distance) determined for the particular character.

In certain embodiments, the threshold engine 308 may be configured and/or designed to determine, for a corresponding set of data (e.g., a set of one or more files/texts/requests/messages, and/or one or more components of a file/message/text/request), a number of outliers (e.g., via one or more thresholds) to determine whether the corresponding set of data is anomalous. In certain embodiments, usage of one or more thresholds (e.g., a first threshold and/or second thresholds) by the threshold engine 308 can increase the robustness of the system 300. The threshold engine 308 (and/or other components of the system 300) can use knowledge or information of a computational object, an application, and/or computational environment to determine the threshold(s). For example, the threshold engine 308 can use and/or consider a distance distribution (e.g., of a distance metric discussed herein), a number of unique characters in a set of data, a size of a vocabulary, a number of detected outliers in a set of data, a length of the data (e.g., file, text, message, and/or request) and/or other factors to determine the threshold(s).

In certain embodiments, the threshold engine 308 can use and/or combine the one or more thresholds to increase/maximize a recall and/or precision of the system 300. In one example, the threshold engine 308 can determine a first threshold, a second threshold, and/or other thresholds to determine whether the corresponding set of data is anomalous. For example, if the number of outliers for the corresponding set of data exceeds the first threshold, and/or the distance metrics of the characters in aggregate (e.g., determined according to $\text{dist}(x,\mu,\sigma)=\Sigma_{i=1}^{n-1}(|x-\mu_i|/\sigma_i)$) for the corresponding set of data exceeds the second threshold, the threshold engine 308 may determine that the corresponding set of data is anomalous (e.g., is an attempt to discover a vulnerability in an application, resource, and/or service). In some embodiments, the first threshold may include or correspond to a $k^{th}$ percentage (e.g., 20% to 80%, and/or other percentage values) of unique characters in the corresponding set of data (e.g., a file). In some embodiments, the second threshold may include or correspond to a $p^{th}$ percentile (95% to 99.9%, and/or other percentage values) confidence interval of an upper bound of a distance.

Level 2: An Approach for Learning Structural Features from a Request

In certain embodiments, each of the sets of data from the plurality of sets of data may comprise a component of a message, request, text, and/or file. In some embodiments, a request can include a HTTP message or request. The HTTP is an application layer protocol used as a foundation of data communications for the World Wide Web. For example, one or more clients can send a plurality of HTTP requests to at least one server (e.g., a remote server). In certain embodiments, one or more components of a message or request (e.g., HTTP request) may include (or be decomposed into) a header component (e.g., a request header field), a uniform resource locator (URL) component and/or a parameter component. In some embodiments, an HTTP request can include a request line, an empty line, and/or an optional message body.

In one example, the systems and methods described herein can be applied to a HTTP request, wherein the system 300, for example, can process and/or analyze the HTTP request (e.g., a corresponding set of data) to determine whether the HTTP request is anomalous. To retain structural, contextual, and/or semantic information of the HTTP request, the HTTP request can be decomposed and/or separated into the one or more components (e.g., a header component, a URL component and/or a parameter component). As such, at least some aspects of the systems and methods described herein can be applied to (or used to process) each individual component of the HTTP request separately.

Level 3: An Overall Classification Scheme

To retain structural, contextual, and/or semantic information of a request (e.g., an HTTP requests and/or other requests that include text or characters), the approach described in Level 2 can be separately applied to each individual component of the request (e.g., a header component, a URL component and/or a parameter component). As such, one or more statistical properties associated with each individual component of the request can be measured, analyzed, computed, and/or determined. In certain embodiments, an output of the threshold engine 308 for each individual component of the request can be combined and/or aggregated (e.g., to determine whether the request is anomalous). For example, the threshold engine 308 may calculate a number of outliers for the header component of the request, and/or the distance metrics of the characters in aggregate for the header component of the request. Furthermore, the threshold engine 308 may calculate a number of outliers for the URL component of the request, and/or the distance metrics of the characters in aggregate for the URL component of the request. In addition, the threshold engine 308 may determine a number of outliers for the parameter component of the request, and/or the distance metrics of the characters in aggregate for the parameter component of the request. Responsive to determining the number of outliers and/or the distance metrics for each component of the request, the threshold engine 308 may determine whether each number of outliers and/or distance metrics (e.g., for a particular component of the request) exceeds one or more thresholds. If one or more of the number of outliers and/or distance metrics for each component of the request exceeds at least one threshold, the threshold engine 308 may determine the request is anomalous (e.g., a potential attempt to discover vulnerabilities in a system/application).

Figure 4:
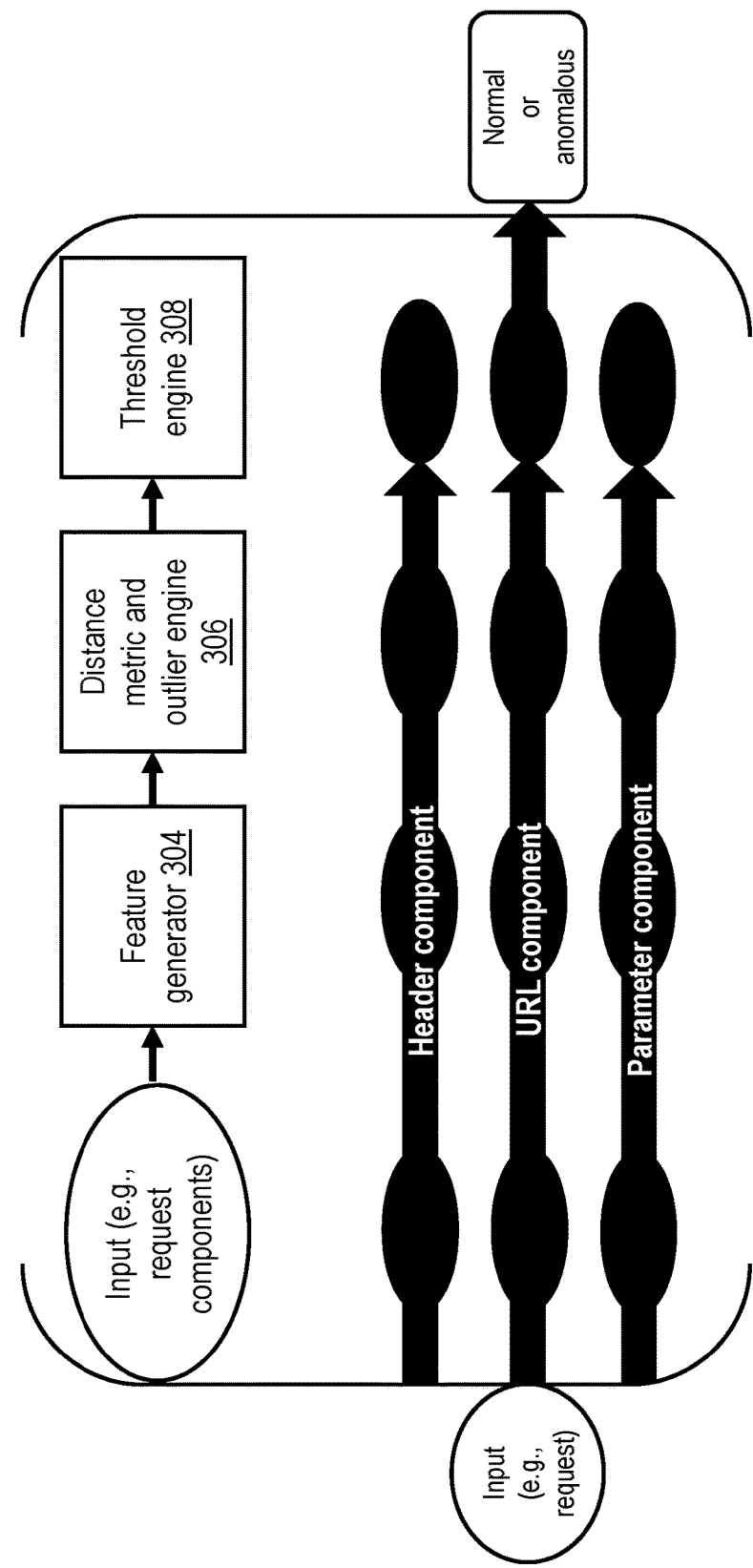
FIG. 4 is a block diagram of a system for detecting a novel or unknown sensory pattern for each component of a request, in accordance with an illustrative embodiment.

Referring now to FIG. 4, depicted is a block diagram of one example embodiment of a system 400 for detecting a novel or unknown sensory pattern for each component of a request (e.g., a header component, a URL component and/or a parameter component). The feature generator 304, distance metric and outlier engine 306, and threshold engine 308 of system 400 may include one or more features of the feature generator 304, distance metric and outlier engine 306, and threshold engine 308 of system 300 in FIG. 3. The system 400 can process and/or analyze each component and/or part of a HTTP request, for example, to determine whether the HTTP request is anomalous. Responsive to analyzing each component of the HTTP request, the system 400 can combine a result of a determination for each component (e.g., a header component is determined to be anomalous, a URL component is determined to be anomalous, and/or other determinations) to determine whether the entire HTTP request is anomalous. For example, if at least a parameter component of the HTTP request is determined to be anomalous, the HTTP request (as a whole) can be anomalous/malicious.

Level 4: Binomial Threshold to Improve Specificity

In certain embodiments, one or more requests (e.g., HTTP request) from a client (e.g., requests during a same visit/login/connection/time-window to a website, application, resource and/or service) can be grouped into a session. One or more approaches can be used to determine a session (e.g., a user session), wherein the one or more approaches may use or include an internet protocol (IP), a user agent, an idle timeout, and/or one or more cookies. In certain embodiments, the one or more approaches can be used to group and/or cluster the one or more requests together as belonging to a session. If an unusually high density of suspicious requests (e.g., possible anomalies) is detected during a session (e.g., at a particular time instance or interval), the suspicious requests can be reported together for further investigation. The rationale behind said approach is that malicious attempts and/or attacks (e.g., anomalous requests) often occur in bulk. As such, said behavior or knowledge (e.g., modeled according to a Binomial distribution) can be leveraged to learn or otherwise determine a threshold (e.g., a third threshold) based on a specificity and/or a total number of requests during a given session and/or time interval. If the total number of malicious requests exceeds a third threshold (e.g., determined by a threshold engine 308), for example, the group of one or more requests belonging to a session, and/or the session itself, can be determined to be malicious (e.g., determined by system 300 and/or system 400). For example, the system 300 (or system 400) can determine that a plurality of sets of data (e.g., one or more requests and/or one or more components of request) is anomalous when a number of the sets of data in a group that is anomalous exceeds a third threshold.

In certain embodiments, the third threshold can be determined (e.g., by the threshold engine 308 and/or other components) according to a Binomial distribution. A Binomial distribution can describe a probability of a success or failure in an experiment that is performed a plurality of times. A Binomial distribution can be defined by two parameters. The two parameters may include or correspond to a number of times the experiment is performed (e.g., N) and/or the probability P of a particular outcome (e.g., success or failure). As such, the total number of requests belonging to a session can be modeled by N, and/or the specificity of the systems and methods described herein can be modeled as the probability P. Therefore, a Binomial distribution can be used to determine and/or learn the third threshold (e.g., t). For example, the third threshold can indicate that for a session with a total number of requests N, the systems and methods described herein may detect and/or identify at least t number of anomalous requests (from the total number of requests N) according to a confidence score c. If the number of anomalous requests in a session exceeds a particular threshold, the entire session can be determined to be anomalous.

Figure 5:
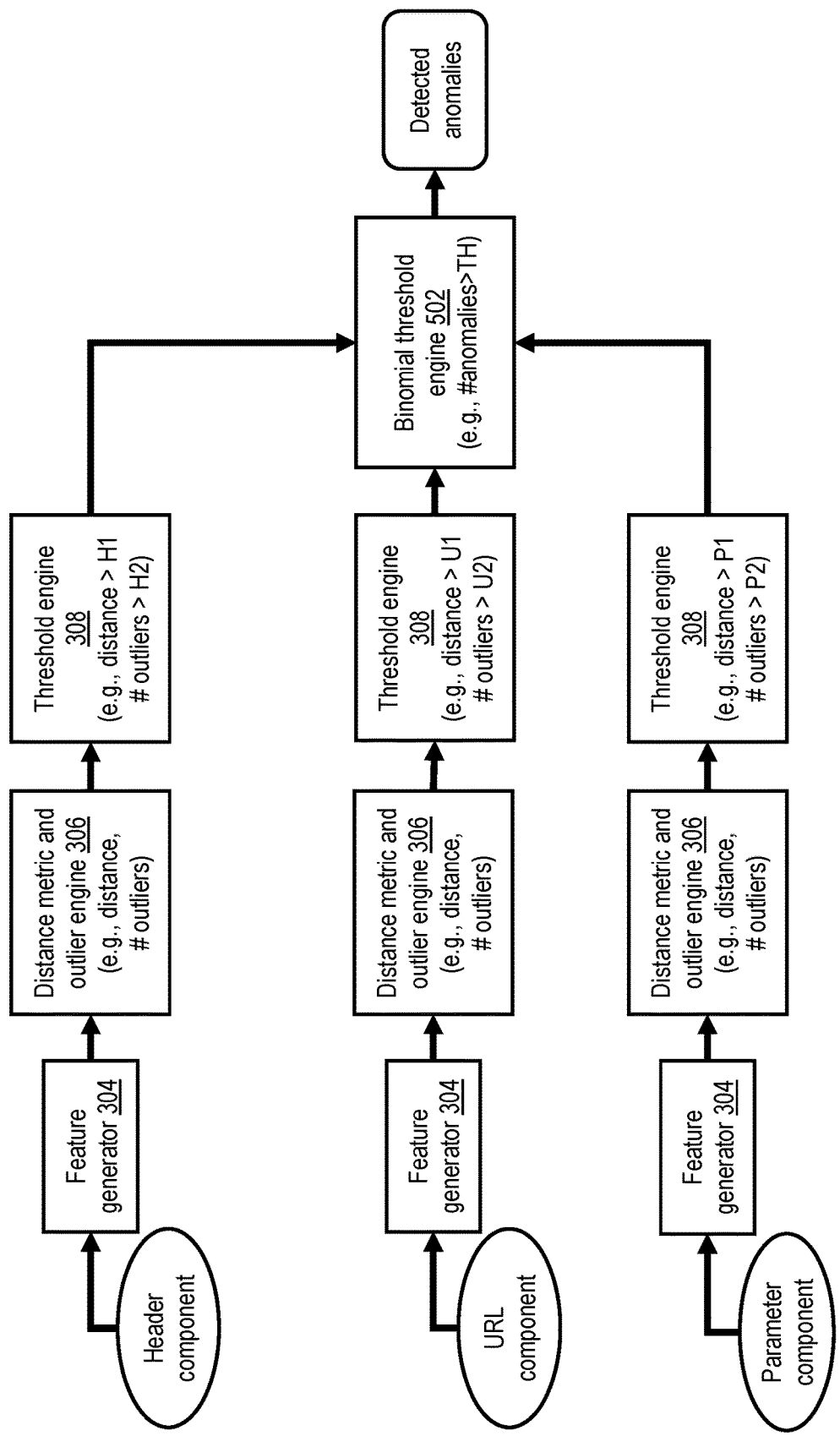
FIG. 5 is a block diagram of a system for detecting a novel or unknown sensory pattern for each component of a request by grouping one or more requests into a session, in accordance with an illustrative embodiment.

Referring now to FIG. 5, depicted is a block diagram of one example embodiment of a system 500 for detecting a novel or unknown sensory pattern for each component of a request by grouping one or more requests into a session. The feature generator 304, distance metric and outlier engine 306, and threshold engine 306 of system 500, for example, may include one or more features of the feature generator 304, distance metric and outlier engine 306, and threshold engine 306 of FIGS. 3-4. Responsive to detecting and/or determining one or more probable anomalous requests (e.g., by analyzing each component of a request according to the feature generator 304, the distance metric and outlier engine 306, and the threshold engine 308), the probable anomalous requests can be organized and/or grouped into a same session by the Binomial threshold engine 502. The Binomial threshold engine 502 may determine whether the probable anomalous requests, grouped in a same session, exceed a third threshold. In certain embodiments, the Binomial threshold engine 502 may determine the third threshold. If the total number, amount, and/or quantity of probable anomalous requests of a same session exceed the third threshold, the system 500 may determine that the probable anomalous requests (and/or the session) are indeed anomalous.

Level 5: A Novel Online Learning Approach

The systems and methods described herein can frequently (e.g., on a daily basis or in real-time) generate and/or receive a plurality of data (e.g., requests, messages, and/or files), wherein the plurality of data may be used to increase the accuracy of the systems and methods (e.g., dynamically or in real-time). Certain approaches, such as a batch job, can periodically update the systems and methods according to a fixed time interval (e.g., every day, every week, and/or other time intervals). In contrast, an online learning approach can perform an initial estimation of one or more parameters associated with the systems and methods (e.g., a distance metric, a mean of character counts, a standard deviation of character counts, and/or other metrics/parameters), and continuously update said parameter(s) (e.g., select at least one observation from the training population and recalibrate a weight associated with each parameter). The online learning approach discussed here can be computationally efficient, and/or able to capture new variations in traffic of data (e.g. requests and/or messages) across time.

The online learning approach may learn and/or update one or more parameters associated with the systems and methods according to a pattern of a current traffic, thereby incorporating changes/variations in the pattern in continuous manner (e.g., without waiting for a batch job to run after a day or week). For example, the online learning approach may update and/or adjust the mean and/or the standard variation of character counts of each of a plurality of characters from a plurality of sets of data without performing an excessive amount of computational power (e.g., additional hardware and/or computational resources). The mean (e.g., $M_k$) and the standard variation (e.g., $S_k$) can be updated according to:

$$M_1 = x_1 \text{ and } S_1 = 0$$

$$M_k = M_{k-1} + \frac{x_k - M_{k-1}}{k}$$

$$S_k = S_{k-1} + (x_k - M_{k-1}) * (x_k - M_k)$$

Figure 6:
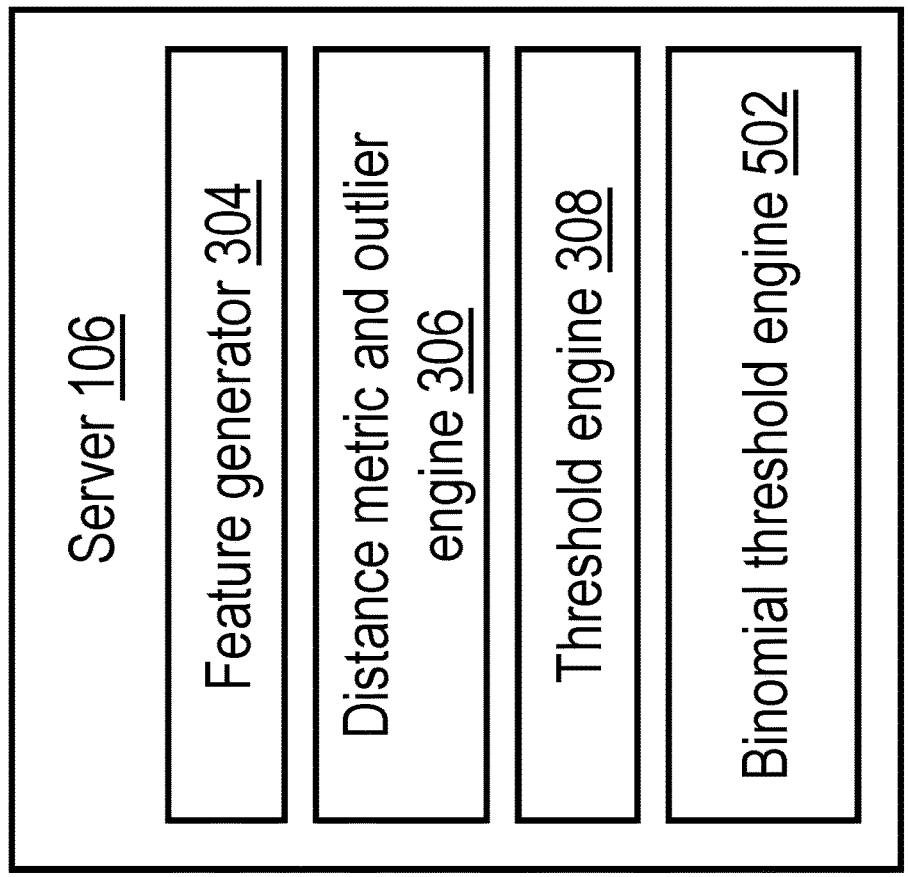
FIG. 6 is a block diagram of a system for detecting malicious attempts to discover vulnerabilities in an application, in accordance with an illustrative embodiment.

For $2 \leq k \leq n$, the $k^{th}$ estimate of the variance is $s^2 = S_k/(k-1)$ Referring to FIG. 6, depicted is a block diagram of one example embodiment of a system 600 for detecting and/or identifying malicious attempts/efforts (e.g., via messages and/or requests) to discover, uncover, or otherwise identify vulnerabilities/weaknesses in an application, resource and/or service. The system 600 may include the feature generator 304, the distance metric and outlier engine 306, the threshold engine 308, and/or the Binomial threshold engine 502. The feature generator 304, the distance metric and outlier engine 306, the threshold engine 308, and/or the Binomial threshold engine 502 can include one or more features associated with the feature generator 304, the distance metric and outlier engine 306, the threshold engine 308, and/or the Binomial threshold engine 502 of FIGS. 3-5. In certain embodiments the system 600 can be implemented in a server 106. The server 106 can include or maintain or have access to at least one application, such as a web application.

Each of the above-mentioned elements or entities is implemented in hardware, or a combination of hardware and software, in one or more embodiments. Each component of the system 600 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 600 may include one or more servers 106. To provide a service/resource/application, the server 106 may execute, provide, provision, and/or host one or more network application(s). In some embodiments, a service/resource may be referred to interchangeably with an application, application resource or network application. An application can for instance include a remote-hosted application, a remote-hosted desktop, a web application or a software-as-a-service (SaaS) application. A remote-hosted desktop may be a virtual desktop hosted on a server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

In some embodiments, the server 106 can be part of a cloud or datacenter for instance. The server 106 may include any embodiment of volatile memory 122 or non-volatile memory 128 (discussed in FIG. 1C for example) which may store files, data and/or content of the service. The server 106 may communicate with other various components of the system 600 in FIG. 3 via a communications interface 118 for instance. Hence, the server 106 may be similar in some aspects to the computer 101 described with reference to FIG. 1C.

Figure 7:
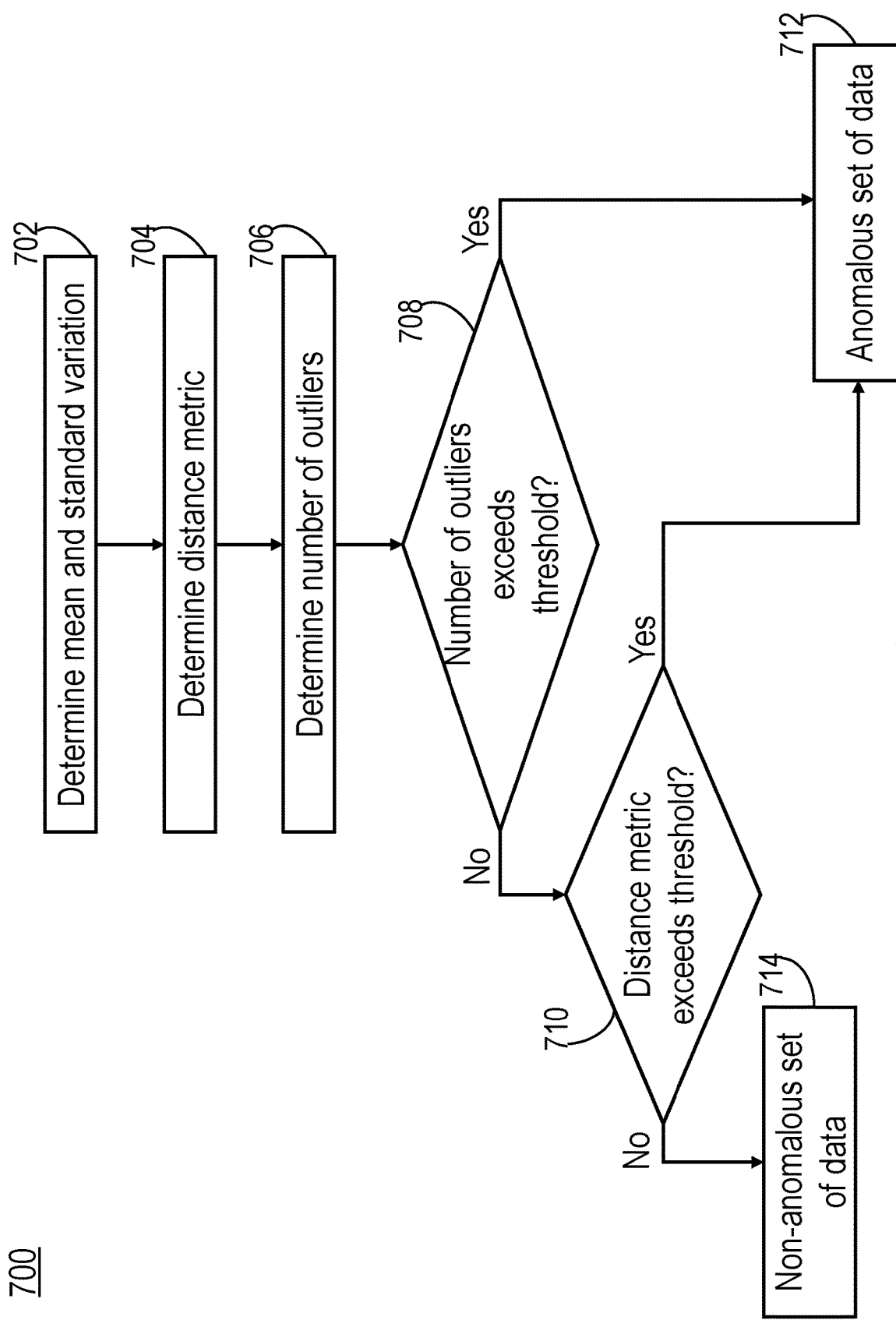
FIG. 7 is a flow diagram of an example method for identifying malicious attempts to detect vulnerabilities in an application, in accordance with an illustrative embodiment.

Referring to FIG. 7, depicted is a flow diagram of one embodiment of a method for identifying malicious attempts (e.g., anomalies) to detect vulnerabilities in an application, resource, and/or service. The functionalities of the method may be implemented using, or performed by, the components detailed herein in connection with FIGS. 1-6. In brief overview, at least one processor may determine a mean and/or a standard variation of character counts of each of a plurality of characters (702). The at least one processor may determine a distance metric for each of the characters (704). The at least one processor may determine a number of outliers for a corresponding set of data (706). The at least one processor may determine whether the number of outliers exceeds a first threshold (708). The at least one processor may determine whether the distance metrics in aggregate for the corresponding set of data exceeds a second threshold (710). The at least one processor may determine that the corresponding set of data is anomalous (712) or not anomalous (714).

Referring now to operation (702), and in some embodiments, the at least one processor (e.g., at least one processor of a feature generator 304) may determine, calculate, and/or compute a mean of character counts of each of a plurality of characters from a plurality of sets of data. In addition or alternatively, the at least one processor may determine a standard variation of the character counts of each of the plurality of characters from the plurality of sets of data. For instance, at least one processor of a feature generator 304 can determine, compute, and/or calculate a mean, a standard variation, and/or other statistical properties of the character counts of each of the plurality of characters in a plurality of sets of data. Each character count may specify and/or indicate a frequency of occurrence of a character. In one example, the character count (e.g., cf(c,D)) may correspond to a number of times a character occurs in a corresponding set of data (e.g., HTTP message). In certain embodiments, the plurality of sets of data can include or correspond to one or more components of a message/request/text/file, and/or one or more files/messages/texts/requests. In one example, each of the sets of data may comprise a component of a message, request, and/or a file. For example, each of the sets of data may comprise at least one of a header component, a URL component and/or a parameter component. A HTTP message (and/or other types of messages or requests) may include the header component, URL component and/or parameter component. In another example, each of the sets of data may comprise (all components of) a message, request, and/or a file.

Referring now to operation (704), and in some embodiments, the at least one processor (e.g., at least one processor of a distance metric and outlier engine 306) may determine, calculate, and/or compute a distance metric for each of the characters in each of the sets of data. For a particular file, request, and/or message (e.g., a corresponding set of data), for example, the distance metric may indicate and/or specify a distance or separation between a distribution (e.g., a pattern) associated with the particular file/request/message and a known or seen distribution (e.g., a distribution of a plurality of sets of data, such as a corpus). In certain embodiments, the distance metric and outlier engine 306 may determine a computationally-efficient distance metric referred to as a MD distance. The at least one processor may determine the MD distance for each of the characters in each of the sets of data according to $|x-\mu_i|/\sigma_i$ (e.g., individual character MD distance). In certain embodiments, the at least one processor may calculate and/or determine the distance metrics in aggregate for a corresponding set of data (e.g., aggregate MD distance) according to $\mathrm{dist}(x,\mu,\sigma)=\Sigma_{i=1}^{n-1}(|x-\mu_i|/\sigma_i)$. As such, the distance metrics in aggregate for the corresponding set of data can be determined according to an absolute distance between a character count for a given character and a mean value of the character count for the given character, summed over a plurality of character counts (e.g., character counts of each of a plurality of characters from a plurality of sets of data).

Referring now to operation (706), and in some embodiments, the at least one processor (e.g., at least one processor of a distance metric and outlier engine 306) may determine a number of outliers for a corresponding set of data. The at least one processor may determine whether the number of outliers (e.g., for each character in a corresponding set of data) exceeds a corresponding threshold. If the number of outlier exceeds the first threshold, the at least one processor may determine that the corresponding set of data (e.g., a particular HTTP request) is anomalous (e.g., an attempt to detect vulnerabilities in an application). In certain embodiments, the at least one processor may determine, for the corresponding set of data, the number of outliers according to a number of the character counts that each exceeds a corresponding threshold. For example, the at least one processor may determine the number of outliers for a particular HTTP request (e.g., a corresponding set of data), for instance, by determining whether a distance (e.g., an individual MD distance) between a particular character count of a character of the HTTP request and a mean value of the character count (e.g., across a plurality of HTTP requests) exceeds a corresponding threshold (e.g., $|x-\mu_i|/\sigma_i>$ a corresponding threshold). The at least one processor may determine a distance (e.g., an individual MD distance) between a particular character count of a character of the HTTP request and a mean value of the character count (e.g., across a plurality of HTTP requests) for each character in a corresponding set of data (e.g., an HTTP request and/or components of a request). Responsive to calculating said distance, the at least one processor may determine whether each distance exceeds a corresponding threshold (e.g. a particular threshold for each character). For a particular character, if a corresponding distance exceeds the corresponding threshold, the character can contribute to the number of outliers for the corresponding set of data. In certain embodiments, the at least one processor may determine the corresponding threshold according to a distance metric determined for a corresponding character (e.g., based an individual MD distance for each character).

Referring now to operation (708), and in some embodiments, the at least one processor (e.g., at least one processor of a threshold engine 308) may determine whether the number of outliers exceeds a first threshold. For example, responsive to determining a number of outliers for a corresponding set of data (e.g., for each component of a HTTP request), the at least one processor may determine whether the number of outliers exceeds the first threshold. In some embodiments, the first threshold may include or correspond to a $k^{th}$ percentage (e.g., 20% to 80%, and/or other percentage values) of unique characters in the corresponding set of data (e.g., a file). Furthermore, the at least one processor (e.g., at least one processor of a threshold engine 308) may determine whether the distance metrics in aggregate for the corresponding set of data exceeds a second threshold (710). For example, the at least one processor may determine the distance metrics in aggregate for the corresponding set of data according to $dist(x,\mu,\sigma)=\Sigma_{i=1}^{n-1}(|x-\mu_i|/\sigma_i)$. As such, the at least one processor can aggregate, sum or otherwise combine each distance metric determined for a corresponding character (e.g. an individual MD distance for each character) to determine the distance metrics in aggregate for the corresponding set of data. If the distance metrics in aggregate for the corresponding set of data (e.g., $dist(x,\mu,\sigma)=\Sigma_{i=1}^{n-1}(|x-\mu_i|/\sigma_i)$) exceed a second threshold, the at least one processor may determine that the corresponding set of data is anomalous. In certain embodiments, the at least one processor may determine whether the corresponding set of data is anomalous or not anomalous, according to the number of outliers and/or the distance metrics in aggregate for the corresponding set of data (712 and 714). For example, if the number of outliers for the corresponding set of data exceeds the first threshold, and/or the distance metrics of the characters in aggregate (e.g., determined according to $dist(x,\mu,\sigma)=\Sigma_{i=1}^{n-1}(|x-\mu_i|/\sigma_i)$) for the corresponding set of data exceeds the second threshold, the threshold engine 308 may determine that the corresponding set of data is anomalous (e.g., is an attempt to discover a vulnerability in an application, resource, and/or service).

In some embodiments, the at least one processor (e.g., at least one processor of a Binomial threshold engine 502) may determine that the plurality of sets of data is anomalous when a number of the sets of data in the group that is anomalous exceeds a third threshold. In one example, one or more requests (e.g., HTTP request) from a client (e.g., requests during a same visit to a website, application, resource and/or service) can be grouped into a session. A particular number (e.g., a subset) of the one or more requests in a session (e.g., a number of the sets of data in the group) can be determined to be anomalous. If the number of requests in a session determined to be anomalous exceed a third threshold, the requests grouped into the session (or the session itself) may be anomalous. The third threshold can be determined (e.g., by at least one processor of a Binomial threshold engine 502) according to a Binomial distribution. For example, the total number of requests belonging to a session can be modeled by a parameter N of a Binomial distribution. The specificity of the systems and methods described herein (e.g., to detect anomalies) can be modeled as the probability P of the binomial distribution. As such, the third threshold can indicate that for a session with a total number of requests N, the systems and methods described herein may detect and/or identify at least t number of anomalous requests (from the total number of requests N) according to a confidence score c. In certain embodiments, the at least one processor may initiate and/or perform a remedial or preventive action (e.g., to prevent a malicious actor from accessing unauthorized information and/or performing unauthorized actions). The at least one processor may initiate and/or execute the remedial/preventive action responsive to determining that the plurality of sets of data is anomalous. For example, the at least one processor may record and/or monitor the actions of a client that is sending and/or broadcasting anomalous HTTP requests (e.g., the plurality of sets of data). In another example, the at least one processor can log-off, disconnect, and/or terminate a connection/session of said client to prevent the client from accessing unauthorized information and/or performing unauthorized actions.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
   determining, by at least one processor, character counts of each of a plurality of characters from a plurality of sets of data, and a mean and a standard variation of the character counts of each of the plurality of characters;
   determining, by the at least one processor, a distance metric for each of the plurality of characters in each of the plurality of sets of data, wherein the distance metric is a MD distance which is defined as a sum over the plurality of characters of an absolute distance between a character count for a given character and the mean of the character counts for the given character;
   determining, by the at least one processor for a corresponding set of data, a number of outliers to determine whether the corresponding set of data is anomalous; and
   initiating, by the at least one processor, an action that prevents at least one of (a) accessing unauthorized information, or (b) performing an unauthorized action, in response to determining that the plurality of sets of data is anomalous.

2. The method of claim 1, wherein determining the number of outliers comprises:
   determining, by the at least one processor for the corresponding set of data, the number of outliers according to a number of the character counts that each exceeds a corresponding threshold.

3. The method of claim 2, comprising:
   determining, by the at least one processor, the corresponding threshold according to a distance metric determined for a corresponding character.

4. The method of claim 1, comprising:
   determining, by the at least one processor, that the corresponding set of data is anomalous when the number of outliers exceeds a first threshold, and the distance metrics in aggregate for the corresponding set of data exceeds a second threshold.

5. The method of claim 4, comprising: determining, by the at least one processor, that the plurality of sets of data is anomalous when a number of the plurality of sets of data in a group that is anomalous exceeds a third threshold.

6. The method of claim 5, wherein the third threshold is determined according to a Binomial distribution.

7. The method of claim 1, wherein each of the plurality of sets of data comprises a component of a message or a file.

8. The method of claim 7, wherein each of the plurality of sets of data comprises: a header component, a uniform, resource locator (URL) component or a parameter component, of a hypertext transfer protocol (HTTP) message.

9. A device comprising:
   at least one processor configured to:
      determine character counts of each of a plurality of characters from a plurality of sets of data, and a mean and a standard variation of the character counts of each of the plurality of characters;
      determine a distance metric for each of the plurality of characters in each of the plurality of sets of data, wherein the distance metric is a MD distance which is defined as a sum over the plurality of characters of an absolute distance between a character count for a given character and the mean of the character counts for the given character;
      determine, for a corresponding set of data, a number of outliers to determine whether the corresponding set of data is anomalous; and
      initiate an action that prevents at least one of (a) accessing unauthorized information, or (b) performing an unauthorized action, in response to determining that the plurality of sets of data is anomalous.

10. The device of claim 9, wherein the at least one processor is configured to determine the number of outliers by:
    determining, for the corresponding set of data, the number of outliers according to a number of the character counts that each exceeds a corresponding threshold.

11. The device of claim 10, wherein the at least one processor is configured to:
    determine the corresponding threshold according to a distance metric determined for a corresponding character.

12. The device of claim 9, wherein the at least one processor is configured to:
    determine that the corresponding set of data is anomalous when the number of outliers exceeds a first threshold, and the distance metrics in aggregate for the corresponding set of data exceeds a second threshold.

13. The device of claim 12, wherein the at least one processor is configured to: determine that the plurality of sets of data is anomalous when a number of the plurality of sets of data in a group that is anomalous exceeds a third threshold.

14. The device of claim 13, wherein the third threshold is determined according to a Binomial distribution.

15. The device of claim 9, wherein each of the plurality of sets of data comprises a component of a message or a file.

16. The device of claim 15, wherein each of the plurality of sets of data comprises: a header component, a uniform, resource locator (URL) component or a parameter component, of a hypertext transfer protocol (HTTP) message.

17. A non-transitory computer readable medium storing program instructions for causing at least one processor to:
determine character counts of each of a plurality of characters from a plurality of sets of data, and a mean and a standard variation of the character counts of each of the plurality of characters;
determine a distance metric for each of the plurality of characters in each of plurality of the sets of data, wherein the distance metric is a MD distance which is defined as a sum over the plurality of characters of an absolute distance between a character count for a given character and the mean of the character counts for the given character;
determine, for a corresponding set of data, a number of outliers to determine whether the corresponding set of data is anomalous; and
initiate an action that prevents at least one of (a) accessing unauthorized information, or (b) performing an unauthorized action, in response to determining that the plurality of sets of data is anomalous.

18. The non-transitory computer readable medium of claim 17, wherein the program instructions further cause the at least one processor to:
determine, for the corresponding set of data, the number of outliers according to a number of the character counts that each exceeds a corresponding threshold.

* * * * *